United States Patent
Sun et al.

(10) Patent No.: US 7,904,942 B2
(45) Date of Patent: Mar. 8, 2011

(54) METHOD OF UPDATING INTRUSION DETECTION RULES THROUGH LINK DATA PACKET

(75) Inventors: Meng Sun, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 636 days.

(21) Appl. No.: 12/036,163

(22) Filed: Feb. 22, 2008

(65) Prior Publication Data
US 2009/0217341 A1    Aug. 27, 2009

(51) Int. Cl.
*G06F 17/00* (2006.01)
*G06F 11/00* (2006.01)
*G06F 12/14* (2006.01)
*G06F 12/16* (2006.01)
*G08B 23/00* (2006.01)
*H04L 29/06* (2006.01)

(52) U.S. Cl. .................................. 726/1; 726/23
(58) Field of Classification Search .......... 726/1, 23
See application file for complete search history.

(56) References Cited

U.S. PATENT DOCUMENTS

| | | | |
|---|---|---|---|
| 6,442,694 B1 * | 8/2002 | Bergman et al. | 726/22 |
| 7,383,577 B2 * | 6/2008 | Hrastar et al. | 726/23 |
| 7,716,515 B2 * | 5/2010 | Shih | 713/500 |
| 7,735,115 B2 * | 6/2010 | Maeno | 726/1 |
| 2003/0101259 A1 * | 5/2003 | Lu | 709/224 |
| 2004/0022316 A1 * | 2/2004 | Ueda et al. | 375/240.05 |
| 2009/0178140 A1 * | 7/2009 | Cao et al. | 726/23 |
| 2009/0235355 A1 * | 9/2009 | Chen et al. | 726/23 |
| 2010/0188975 A1 * | 7/2010 | Raleigh | 370/230.1 |
| 2010/0251370 A1 * | 9/2010 | Sun et al. | 726/23 |

* cited by examiner

*Primary Examiner* — Farid Homayounmehr
(74) *Attorney, Agent, or Firm* — Apex Juris, pllc; Tracy M Heims

(57) ABSTRACT

A method of updating intrusion detection rules through a link data packet is used to dynamically update rules storages of Snort system hosts. Firstly, an update sponsor in the network transmits a link data packet with an intrusion detection rule to the Snort system host. The Snort system host acquires the intrusion detection rule from the received link data packet, and parses an operation type of the intrusion detection rule. Then, the Snort system host verifies the validity of the intrusion detection rule. Subsequently, the rules storage is updated according to the type of the valid intrusion detection rule and a rules tree.

7 Claims, 4 Drawing Sheets

METHOD OF UPDATING INTRUSION DETECTION RULES THROUGH LINK DATA PACKET

BACKGROUND OF THE INVENTION

1. Field of the Invention

The present invention relates to a method of updating intrusion detection rules, and more particularly, to a method of dynamically updating intrusion detection rules through a network link data.

2. Related Art

An intrusion detection system (IDS) is an important technology for protecting data in computer systems from being stolen and protecting the computer systems from malicious damages. Through the intrusion detection system together with the firewalls, malicious intrusions from external or internal networks can be efficiently prevented. Snort, as the important well-known open source software in the IDS technical field, filters network intrusion actions through using built-in intrusion detection rules, based on detection of signatures and communication protocols. As the continuous changing of the intrusion actions, the intrusion detection rules may also be changed and updated, or appropriate intrusion detection rules are designed depending upon requirement of computer hosts in the LAN. The intrusion detection rule of the Snort system adopts a lightweight script language, and most of the intrusion detection rules are represented in a single line, or described by using the symbol "/" to separate the rule descriptions in multiple lines. Each intrusion detection rule includes a header, a communication protocol, an IP address, a connection port number, and an advanced rules file. For example, the rule "alert TCP any→192.168.1.0/24 111" represents that, if any host attempts to access a network segment the same as the website 192.168.1.0 through TCP protocol, i.e., the Class C network segment of the website 192.168.1.0, and to be connected to a connection with a port number as 111, once the Snort system host receives the network packet, a warn signal is generated immediately. The Snort administrator can not only add/remove an intrusion detection rule through inputting an instruction, but also can directly download a rules document and duplicate it into a designated directory and then restart the Snort system, so as to load new intrusion detection rules.

However, regardless of the method of updating intrusion detection rules by gradually typing in rule instructions, or the method of updating intrusion detection rules by loading rule documents, both of them cannot dynamically update the intrusion detection rules. Instead, the above two methods need uninstall/interrupt the defense means of the original Snort system, and then load new intrusion detection rules. As for the segment that may possibly suffer from network intrusions at anytime anywhere, the longer time is required for interrupting and uninstalling the Snort system, the more easily the internal computer host suffers from malicious intrusions, and as a result, the network security risks may be generated easily. In addition, as for network administrators, if there is a plurality of Snort system hosts in the network (or a plurality of network cards installed with an intrusion detection rules database or storage), the operation of updating the intrusion detection rules must be performed on the hosts (or network cards) one by one, thereby prolonging the updating operation time. What's worse, if the Snort system is burned on an embedded chip of a network card, the chip must be detached to perform the burning procedure, so as to write the updated intrusion detection rules into the chip. Those methods of updating the intrusion rules are all time-consuming and labor-consuming.

SUMMARY OF THE INVENTION

In view of the aforementioned problem that it is rather time-consuming and labor-consuming to update the intrusion detection rules of a plurality of Snort system hosts (or network cards), the present invention is directed to a method of updating intrusion detection rules through a link data packet. Through the features of network packet transmission, an intrusion detection rule to be added is carried in a packet through the link data packet, thereby transmitting and updating the intrusion detection rule to be updated to all the Snort system hosts in the network in sync.

In order to achieve the aforementioned object, the present invention provides a method of updating intrusion detection rules through a link data packet, which includes the following steps. Firstly, an update sponsor transmits a link data packet with at least one intrusion detection rule to a Snort system host in the network. Next, the Snort system host captures the intrusion detection rule from the received link data packet, and parses an operation type of the intrusion detection rule. Then, the Snort system host verifies a validity of the intrusion detection rule in the link data packet. Subsequently, the intrusion detection rules pre-stored in rules storage are updated according to the type of the intrusion detection rule passing the verification and a rules tree.

In the method of updating intrusion detection rules through a link data packet according to a preferred embodiment of the present invention, number of items for the intrusion detection rules in the link data packet is set according to a network scale and a network flow of the LAN, and the preset time needed for updating the rules each time. The fields of a link data packet include a header file, a rule version, a verification code, an authorization code, and a carried intrusion detection rule. The header file further includes an update flag to mark the link data packet. With the update flag, it is more convenient for the Snort system host to determine whether the received link data packet is a packet for updating an intrusion detection rule or not.

In the method of updating intrusion detection rules through a link data packet according to a preferred embodiment of the present invention, the sponsor may designate a network address for transmitting the link data packet. The link data packet may also be transmitted through a broadcast address, such that all the Snort system hosts in the network may receive the link data packet in sync.

In the method of updating intrusion detection rules through a link data packet according to a preferred embodiment of the present invention, the step that all the Snort system hosts in the network verify the validity of the intrusion detection rule includes: firstly determining whether the verification code and authorization code of the link data packet are true or not, and then determining whether the link data packet has a newer rule version than that of the rules storage already stored in the storage.

In the method of updating intrusion detection rules through a link data packet according to a preferred embodiment of the present invention, the Snort system host transmits a rules storage request before resetting of the system or power failure, so as to trigger the rules storage to perform the operation of storing the intrusion detection rule with a newer rule version.

In the method of updating intrusion detection rules through a link data packet according to a preferred embodiment of the present invention, the rules storage may be a remote server or a storage device built in the Snort system host.

Based on the above, in the present invention, the link data packet carries the intrusion detection rule to be added, so as to update the rule. Through the link data packet, the updated rule may be broadcasted to all the Snort system hosts in the network, thereby efficiently simplifying the procedures of updating the intrusion detection rule, shortening the time for interrupting the network intrusion detection when updating the Snort system hosts, and reducing the risks for the system hosts in the LAN suffering from intrusions.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The objectives of the present invention and the method of updating intrusion detection rules through a link data packet in the present invention will be illustrated below in detail through the following preferred embodiments. However, the concept of the present invention may also be used in other scopes. The following embodiments are merely intended to illustrate the objectives and implementation methods of the present invention, but not to restrict the scope of the present invention.

Figure 1:
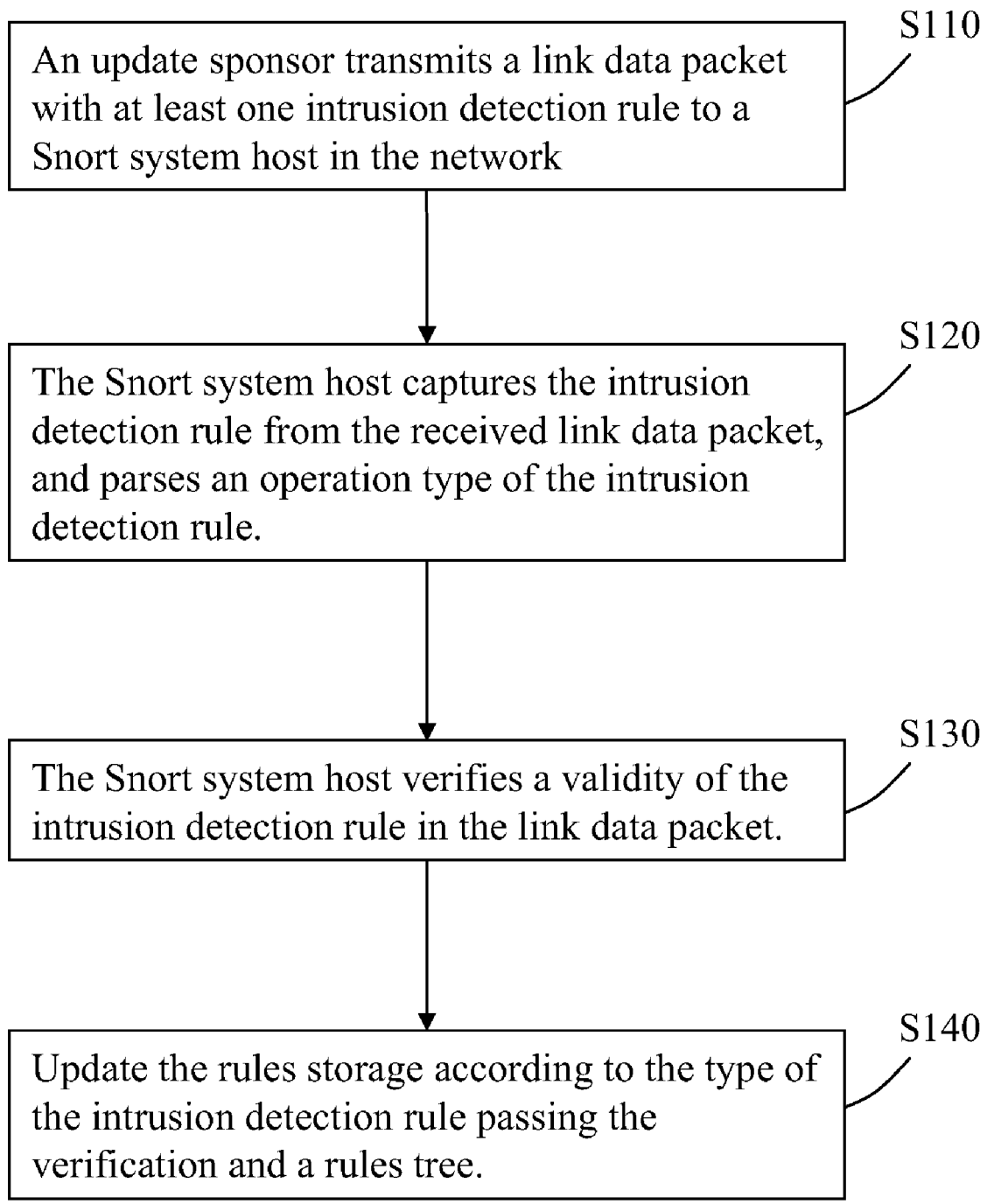
FIG. 1 is a flow chart of a method of updating intrusion detection rules through a link data packet according to the present invention.

FIG. 1 is a flow chart of a method of updating intrusion detection rules through a link data packet according to the present invention. Referring to FIG. 1, the method of updating intrusion detection rules is used to dynamically update the rules storage of at least one Snort system host in an LAN, such that an intrusion detection rule to be updated is quickly written into the rules storage corresponding to each Snort system host. The so-called link data packet refers to link data of the original network packet, i.e., the data in the original network packet that needs to be processed in a network link layer. The method of updating intrusion detection rules through a link data packet provided by the present invention includes the following steps. Firstly, an update sponsor in the LAN transmits a link data packet with at least one intrusion detection rule to a Snort system host (Step S110). Next, after receiving the link data packet, the Snort system host captures the intrusion detection rule from the received link data packet and parses an operation type of the intrusion detection rule (Step S120), for example, determining whether an update instruction in the ink data packet is to newly add or to delete an intrusion detection rule. Subsequently, the Snort system host verifies a validity of the intrusion detection rule in the link data packet (Step S130). Then, the rules storage is updated according to the type of the intrusion detection rule passing the verification and a rules tree (Step S140). The method of updating intrusion detection rules through a link data packet provided by the present invention will be described below through a preferred embodiment of the present invention.

Figure 2:
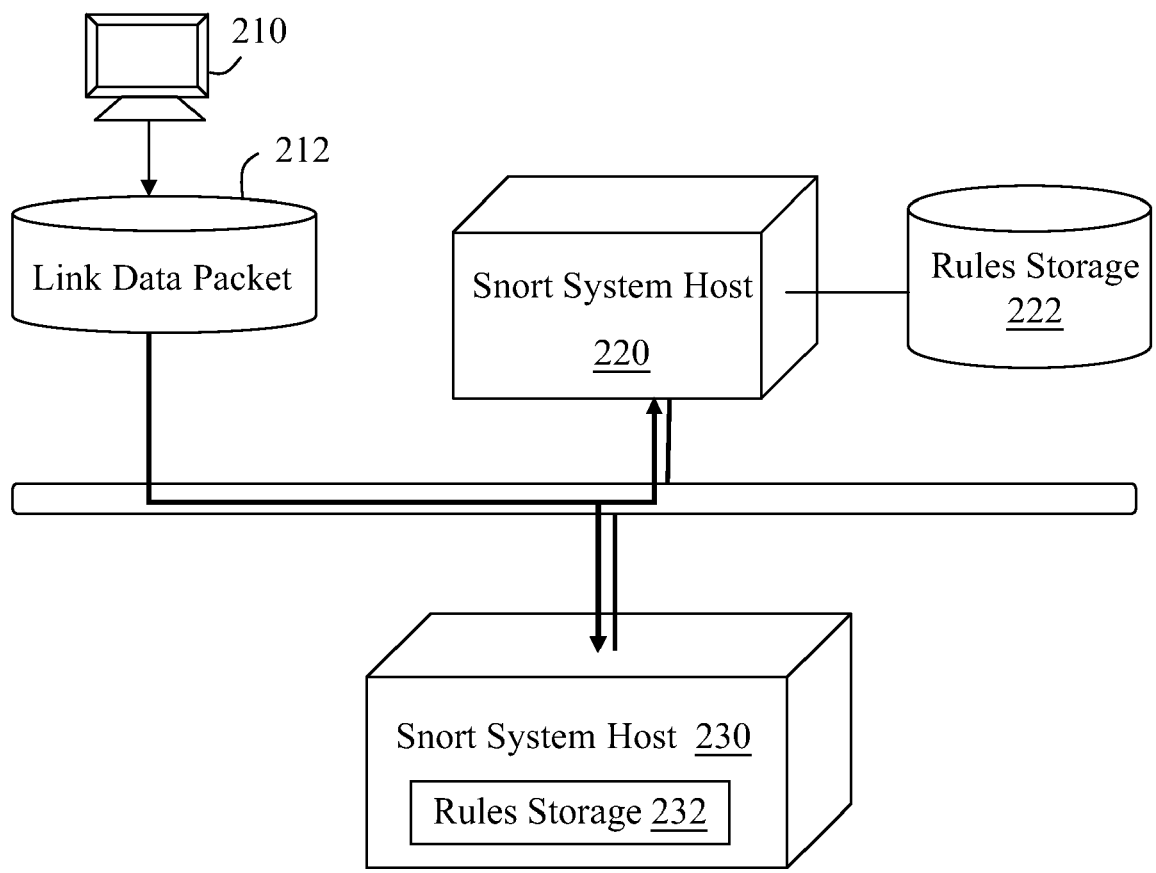
FIG. 2 is a schematic view of system architecture for implementing a method of updating intrusion detection rules through a link data packet according to a preferred embodiment of the present invention.

FIG. 2 is a schematic view of system architecture for implementing a method of updating intrusion detection rules through a link data packet according to a preferred embodiment of the present invention. Referring to FIG. 2, the LAN in the preferred embodiment of the present invention includes two Snort system hosts (220, 230), which respectively read the data of the intrusion detection rules saved in the corresponding rules storages (222, 232), so as to serve as the basis for analyzing the packets flowing through the Snort system hosts. The rules storage may be a remote server (or a common computer host) independent from the Snort system host, for example, the rules storage 222 in FIG. 1; or a storage device built in the Snort system host, for example, the rules storage 232 in FIG. 1. The network administrator designates a certain Snort system host in the LAN at the update sponsor 210 for transmitting a link data packet 212 for updating the intrusion detection rule.

In this embodiment, for example, through the update sponsor 210, the intrusion detection rule(s) to be updated is piggybacked in the link data packet 212 and then transmitted to the Snort system host 220 through a designated network address. In addition, after receiving the network packet, the computer host certainly parses the link data packet in the received network packet. Then, according to an Ethernet header and an IP header in the link data packet, it is further determined whether to continue parsing the contents in the packet or not. Based on the characteristics of the network, the update sponsor 210 transmits the link data packet 212 carrying the intrusion detection rules to be updated through a broadcast address, so that each Snort system host in the LAN may receive the link data packet 212, thereby updating the intrusion detection rules saved in the corresponding rules storages of the Snort system hosts in sync.

Then, each time when the Snort system host processes the operation of updating the intrusion detection rule, the intrusion detection/protection needs to be suspended. When the detection/protection is suspended, computer hosts in the network may be attacked. In fact, network intrusion/attack motions have a specific interval course, so the possibility of suffering from the intrusion attacks may be reduced through controlling the time for suspending the detection/protection. In this embodiment, the update sponsor 210 divides a new intrusion detection rule into different items according to a specific granularity, and then classifies them into different groups according to the adding/deleting operation. Furthermore, the number of items for the intrusion detection rules that are capable of being carried by each link data packet is set according to the network scale (the number of computer hosts) and network flow (the number of the network packets received per minute) of the LAN and a time length preset for performing one updating operation. As such, the time required for the Snort system host to process/update the intrusion detection rules each time is controlled not to exceed a threshold, thereby reducing the risks of suffering from intrusion attacks when updating the intrusion rules.

Figure 3:
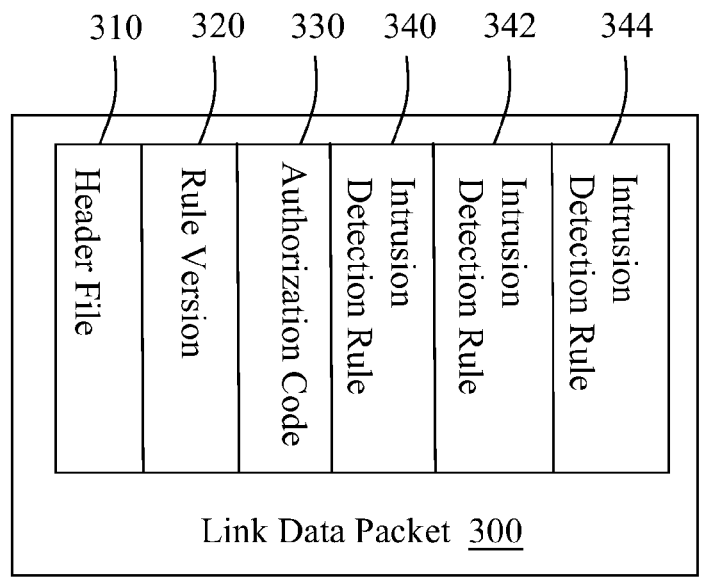
FIG. 3 is a schematic view of a link data packet format according to a preferred embodiment of the present invention.

FIG. 3 is a schematic view of a link data packet format according to a preferred embodiment of the present invention. Referring to FIG. 3, the link data packet 300 in this embodiment includes, for example, a header file 310, a rule version 320, an authorization code 330, and intrusion detection rules (340, 342, and 344). The header file 310 further includes an update flag (not shown) for marking the link data packet 300, so that when receiving the link data packet 300, the Snort system host may conveniently determine whether the link data packet 300 is a network packet for updating the intrusion detection rules. The destination of the transmitted link data packet 300 is recorded in the header file 310. The process of verifying whether the items for the intrusion detection rules carried in the link data packet 300 are the new version or not, or whether the intrusion rules are valid or not are respectively achieved through the parameters of the rule version 320 and the authorization code 330. Before transmitting the link data packet 300, the update sponsor 210 negotiates with the Snort system hosts in the LAN to obtain the authorization code. In this embodiment, a time stamp is recorded as the rule version 320, but the scope of the present invention is not restricted thereby.

After receiving the link data packet 212 from the update sponsor 210, the Snort system hosts (220, 230) firstly capture the intrusion detection rules included in the received packet, and then parse the operation type of the packet. For example, the intrusion detection rule includes a rule header, a communication protocol, a network address, a connection port number, and an operator and so on, and the rule header further includes three types, i.e., alert, log, and pass. Once receiving the link data packet, the Snort system host firstly determines whether it is to add a rule or to delete a rule. Subsequently, according to the rule header, the intrusion detection rules are classified into three types, i.e., alert, log, and pass. The above operation of classifying the intrusion rules aims at ensuring the expandability of the types of execution measures, and assisting the Snort system host to quickly find out the corresponding rule classification during execution. For example, if it is determined to be a Log rule, merely the intrusion rules in the Log need be compared, so as to find out a correspondingly matched rule; and the system only records the log of the data packet without alerting.

Figure 4A:
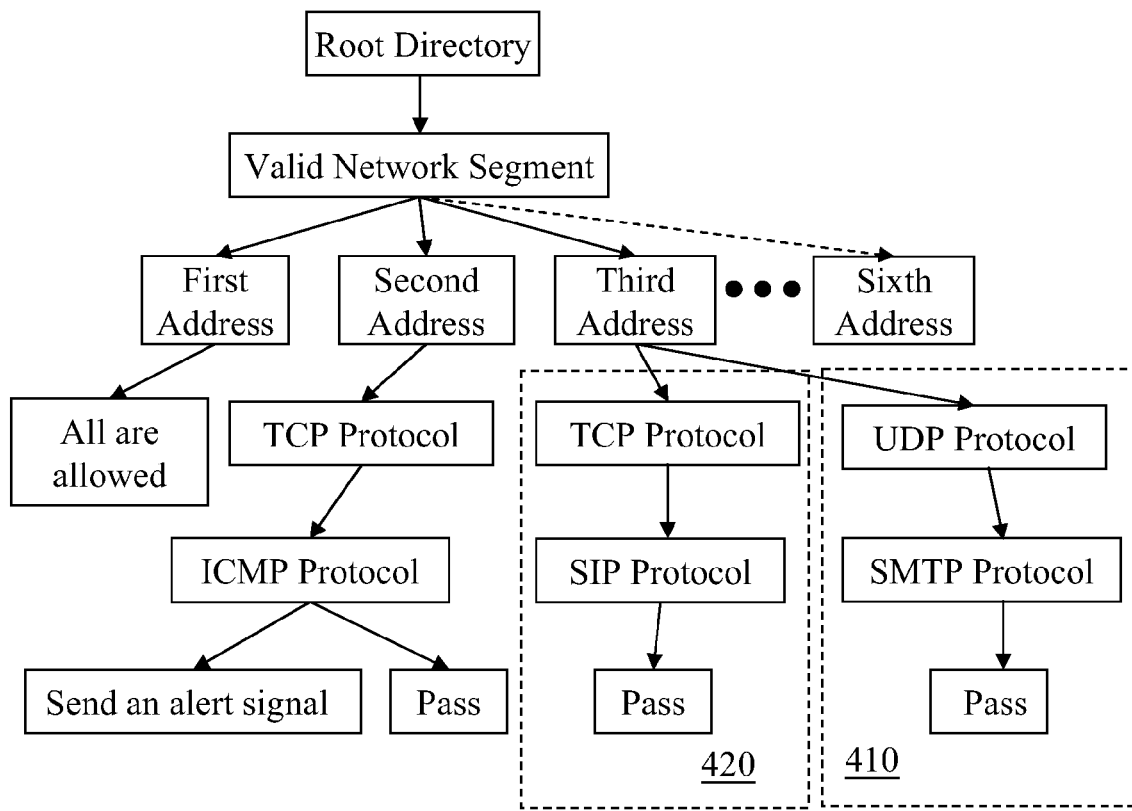
FIG. 4A is a schematic view of a rules tree according to a preferred embodiment of the present invention.

Then, according to the rule version 320 and the authorization code 330, the Snort system host verifies whether the intrusion detection rule of the link data packet has a newer version than the current one, and verifies whether the operation of "updating the intrusion detection rule" is sponsored by a valid and authorized administrator. After the verification process is passed, the Snort system host updates the rules storage through the rules tree according to the type of the intrusion detection rule. In this embodiment, for example, the Snort system host is connected to the corresponding rules storage to read all the intrusion detection rules. Furthermore, according to the parameters of rule header, communication protocol, network address, connection port number, and operator, the rules tree as shown in FIG. 4A is generated, which is used to accelerate the process of finding out the usage corresponding to the newly-added intrusion detection rule. Subsequently, the intrusion detection rule to be updated (added or deleted) is stored back into the corresponding rules storage.

Figure 4B:
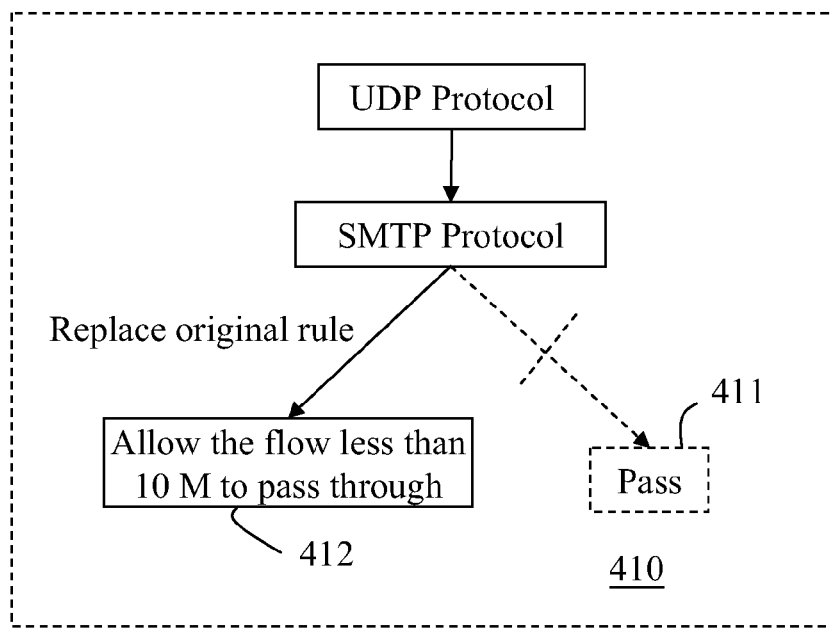
FIG. 4B is a schematic view of a branch of the rules tree in FIG. 4A.
Figure 4C:
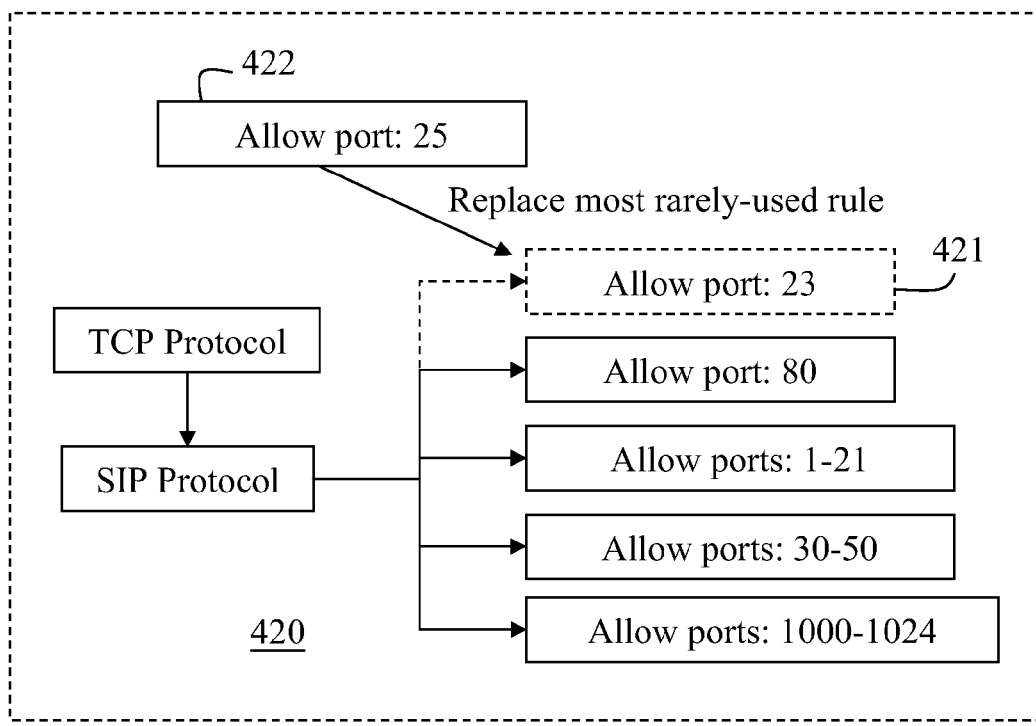
FIG. 4C is a schematic view of a branch of the rules tree in FIG. 4A.

In addition, in order to accelerate the speed of the Snort system host in detecting the network packet, number of items for the intrusion detection rules stored in each rules storage is further restricted in this embodiment. If number of the items for the stored intrusion detection rules excesses a threshold, the rules storage automatically deletes the most rarely-used intrusion detection rules (or the intrusion detection rule with the oldest rule version). For example, FIG. 4B is a schematic view of a branch of the rules tree in FIG. 4A. Referring to FIGS. 4A and 4B, the Snort system host firstly parses adding an intrusion detection rule of "filtering out the letters with the storage space less than 10 M" to the SMTP communication protocol at the third address. Then, the Snort system host captures the intrusion detection rule from the rules storage, and gets to know that the number of the items for the intrusion detection rules is full. Subsequently, the Snort system host generates a rules tree as shown in FIG. 4A, and traverses a rule branch 410 according to the rules tree, and then obtains the older rule of the SMTP communication protocol. Afterwards, the Snort system host further compares the rule version of the newly-added intrusion detection rule 412 with that of the original intrusion detection rule 411, and gets to know that the newly-added intrusion detection rule 412 has a newer rule version, so that the original intrusion detection rule 411 is replaced. Likewise, FIG. 4C is a schematic view of a branch of the rules tree in FIG. 4A. Referring to FIGS. 4A and 4C, the number of the items for the intrusion detection rules is full. However, the Snort system host receives an intrusion detection rule about allowing the connection port number: 25 for the SIP communication protocol at the third address. The Snort system host traverses the rules tree, and when the rule branch 420 is traversed, the Snort system host deletes the most rarely-used rule stored therein, in this embodiment, for example, deleting the intrusion detection rule 421 of "allowing the connection port: 23", and replacing the intrusion detection rule 421 with the intrusion detection rule 422 of "allowing the connection port: 25".

It is worthy to be mentioned that, before booting or resetting the Snort system host, the Snort system host transmits a rules storage request to trigger the rules storage to store the intrusion detection rule with a relatively new rule version. It is the Snort system host that determines whether the rule version is old or new, or the rules storage may compare the rule version of the updated intrusion detection rule with that of the original intrusion detection rule to determine the newer one, but the scope of the present invention is not limited herein.

To sum up, through transmitting a link data packet, the update sponsor in the network may update the intrusion detection rule for the designated Snort system host, and a network administrator may remotely control the update of the intrusion detection rules. In addition, through the technology disclosed in the present invention, the messages such as the newly-added intrusion detection rule may be broadcasted to each node in the LAN, thereby updating the intrusion detection rules adopted by all the Snort system hosts in the LAN in sync, and significantly reducing the time for updating the intrusion detection rules.

What is claimed is:

1. A method of updating intrusion detection rules through a link data packet, adapted to dynamically update a rules storage adopted by at least one Snort system host in a local area network (LAN), comprising:

an update sponsor transmitting the link data packet with at least one intrusion detection rule to Snort system host(s);

the Snort system host(s) acquiring the intrusion detection rule(s) from the received link data packet, and parsing an operation type of the intrusion detection rule(s);

the Snort system host(s) verifying an validity of the intrusion detection rule(s) in the link data packet;

updating the rules storage according to the type of the intrusion detection rule(s) passing the verification and a rules tree; and wherein the number of items for the intrusion detection rules in the link data packet is set according to a network scale and a network flow of the LAN, and preset time needed for updating.

2. The method of updating intrusion detection rules through a link data packet according to claim 1, wherein the link data packet comprises a header file, a rule version, a verification code, an authorization code, and the intrusion detection rule(s).

3. The method of updating intrusion detection rules through a link data packet according to claim 2, wherein the header file further includes an update flag to mark that the link data packet is a packet for updating the intrusion detection rule(s).

4. The method of updating intrusion detection rules through a link data packet according to claim 1, wherein the update sponsor further makes the Snort system host(s) to receive the link data packet in sync through a broadcast address.

5. The method of updating intrusion detection rules through a link data packet according to claim 1, wherein the step that the Snort system host(s) verifies the validity of the intrusion detection rule(s) comprises:

determining whether the verification code and authorization code of the link data packet are true or not; and determining whether the link data packet has a newer rule version than the rules storage.

6. The method of updating intrusion detection rules through a link data packet according to claim 1, wherein the Snort system host(s) transmits a rules storage request before resetting the system or power failure, so as to trigger the rules storage to store the intrusion detection rule(s) with a newer rule version.

7. The method of updating intrusion detection rules through a link data packet according to claim 1, wherein the rules storage is selected from a group consisting of a remote server or a storage device built in the Snort system host(s).

* * * * *